United States Patent
Wang

(10) Patent No.: US 11,025,126 B2
(45) Date of Patent: Jun. 1, 2021

(54) BRUSHED DC MOTOR AND MANUFACTURING METHOD THEREOF

(71) Applicant: Guobin Wang, Brea, CA (US)

(72) Inventor: Guobin Wang, Brea, CA (US)

(73) Assignee: NETMOTOR (U.S.A.) INC., Brea, CA (US)

( * ) Notice: Subject to any disclaimer, the term of this patent is extended or adjusted under 35 U.S.C. 154(b) by 316 days.

(21) Appl. No.: 15/926,945

(22) Filed: Mar. 20, 2018

(65) Prior Publication Data

US 2018/0287451 A1  Oct. 4, 2018

(30) Foreign Application Priority Data

Mar. 20, 2017 (CN) .......................... 201720267736.4
Mar. 20, 2017 (CN) .......................... 201720267766.5

(51) Int. Cl.
| | |
|---|---|
| *H02K 5/14* | (2006.01) |
| *H02K 5/10* | (2006.01) |
| *H01R 39/415* | (2006.01) |
| *H02K 13/10* | (2006.01) |
| *H02K 15/14* | (2006.01) |
| *H02K 5/24* | (2006.01) |
| *H02K 15/00* | (2006.01) |
| *H02K 1/17* | (2006.01) |
| *H02K 5/22* | (2006.01) |

(Continued)

(52) U.S. Cl.
CPC ........... *H02K 5/148* (2013.01); *H01R 39/415* (2013.01); *H02K 1/17* (2013.01); *H02K 5/10* (2013.01); *H02K 5/24* (2013.01); *H02K 13/10* (2013.01); *H02K 15/0006* (2013.01); *H02K 15/14* (2013.01); *H02K 5/08* (2013.01); *H02K 5/1732* (2013.01); *H02K 5/225* (2013.01)

(58) Field of Classification Search
CPC ............ H02K 5/14; H02K 13/10; H02K 5/10; H02K 5/22; H02K 5/24; H02K 1/17; H02K 15/0006; H02K 5/148; H02K 15/14; H01R 39/415
USPC ................................................... 310/229–253
See application file for complete search history.

(56) References Cited

U.S. PATENT DOCUMENTS

| | | | | |
|---|---|---|---|---|
| 4,783,906 A | * | 11/1988 | Gingerich | .............. H02K 5/148 29/827 |
| 7,193,349 B2 | * | 3/2007 | Laurandel | .............. H01R 39/39 310/238 |

(Continued)

FOREIGN PATENT DOCUMENTS

EP  1447900 A2 *  8/2004  ............. H02K 23/66

*Primary Examiner* — Naishadh N Desai

(74) *Attorney, Agent, or Firm* — Raymond Y. Chan; David and Raymond Patent Firm

(57) ABSTRACT

A brushed DC motor includes a motor shell, a stator fixed within the motor shell, an armature rotor rotatably disposed inside the motor shell and surrounding by the stator while forming a gap therebetween with magnetic field, and a brush cap connected with the motor shell by covering an installing opening of the motor shell. The brush cap includes a base layer, an electric circuit layer formed on the base layer, at least one pair of brush frames affixed thereon symmetrically, and at least one pair of brushes respectively installed in the brush frames and electrically connected with the electric circuit layer adapted to receive current and conduct to the armature rotor for driving an output end of the armature rotor to rotate with respect to the stator.

13 Claims, 16 Drawing Sheets

(51) Int. Cl.
*H02K 5/173* (2006.01)
*H02K 5/08* (2006.01)

(56) References Cited

U.S. PATENT DOCUMENTS

| | | | |
|---|---|---|---|
| 8,941,280 B2 * | 1/2015 | Sakon | H02K 23/30 310/198 |
| 2002/0185984 A1 * | 12/2002 | Gold | H02K 9/06 318/17 |
| 2004/0017126 A1 * | 1/2004 | Laurandel | H02K 5/148 310/242 |
| 2008/0185929 A1 * | 8/2008 | Hirabayashi | H02K 1/17 310/154.14 |
| 2011/0025063 A1 * | 2/2011 | Faber | H02K 13/10 290/48 |

\* cited by examiner

BRUSHED DC MOTOR AND MANUFACTURING METHOD THEREOF

CROSS REFERENCE OF RELATED APPLICATION

This is a non-provisional application that claims the benefit of priority under 35 U.S.C. § 119(a-e) to Chinese application number 201720267766.5, filed Mar. 20, 2017 and application number 201720267736.4, filed Mar. 20, 2017.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to brushed DC motor, and more particularly to a brushed DC motor including a motor shell containing a rotatable armature rotor covered by a brush cap affixing at least a pair of brushes in a sunken manner thereon, and a manufacturing method of the brushed DC motor.

Description of Related Arts

With development and application of technology of the electrical motor, more and more devices are hardly to have excellent performance without the motor to drive. Although there are brushless motor and AC motor widely used in devices for driving, but the brushed DC motor is still a preferred choice in many situations that require DC power supply and simply controlling. Especially, considering with the field to the power supply, the speed and torque characteristics of the brushed motor are less complicated to be controlled, and easily to be controlled to provide required speed or speed inversely proportional to the mechanical load.

However, the traditional brushed motor has disadvantages mostly resulted from the brush which is a mechanical structure for conducting the current between stationary wires and moving armature. The brush is the key component of the traditional brushed motor, since the armature is rotated by changing conducted current via the brush.

The disadvantages and problems of the conventional brushed motor are illustrated as follows, mainly pointing out the structure of the conventional brush. The conventional brush is made of carbon or copper carbon pieces to be disposed on the surface of a cover of the brushed motor. Usually, the conventional brushes are stuck in a case to be independently protruded on the surface of the cover and a plurality of connecting wires is simply placed to be connected with a control cable and the brushes for conducting current between a stationary controlling cable and a commutator rotated with an armature. The brushes and the connecting wires are easily worn down as time passed that adversely effects the life span of the brushed motor. Also, the length of the conventional motor is mostly depended on the thickness of the brush and the length of the armature. As the armature is in symmetrical shape and corresponding to the stator, the balance of the traditional motor is decided by the brush structure and the output shaft end. In some applications related with water, well sealing of the conventional brushed motor needs comprehensive design with the output shaft end.

The brushes of the conventional brushed motor are required to be replaced frequently to maintain effectively connection with the commutator. Accordingly, the traditional brushed motor has a lower cost in production but a relatively higher cost in maintenance due to the requirement of frequent replacement of the worn-down brushes which is unfriendly in operation and usage. In other words, the brush replacement requirement becomes a severe problem of the conventional brushed motor. Furthermore, the traditional brushed motor is designed to have high output torque and should be lasting long in high temperature environment. This short coming could result in severe overheating of the commutator, overheating of the connecting wires, damages of the brushes, and potential welding of the brushes to the commutator. Therefore, the brushes, the armature and the connection of the brushes and the armature which forms a complete electrical circuit for the motor to run are desired to have a solution that meets higher standards and requirement to avoid waste of the brushes, additional cost of replacing the brushes and power being drained rapidly, and to provide a more durable performance.

SUMMARY OF THE PRESENT INVENTION

The invention is advantageous in that it provides a brushed DC motor comprising a brush cap with at least a pair of brushes affixed in a sunken manner for covering a motor shell containing an armature rotor therein, so as to reduce a size of the brushed DC motor, avoid overheating and provide durable performance.

The invention is advantageous in that it provides a brushed DC motor, wherein the repairing and component replacement of the brushed DC motor of the present invention is as easy as simply opening the brush cap from the motor shell and then the brushes affixed on the brush cap are detached from the armature rotor contained in the motor shell.

Another advantage of the invention is to provide a brushed DC motor, which is capable of running in high torque application with durable brushes to prolong life span and enhance efficiency.

Another advantage of the invention is to provide a brushed DC motor, wherein the brush cap contains the brushes affixed thereon such that the brushes can be replaced easily by simply replacing the entire brush cap that substantially reduces the difficulty of maintenance of the brushed DC motor.

Another advantage of the invention is to provide a brushed DC motor, wherein the armature rotor of the brushed DC motor is remained in balance during running with two ends of the armature rotor rotating smoothly.

Another advantage of the invention is to provide a brushed DC motor, wherein an output end of the armature rotor is extended from the motor shell with waterproofness and sealingness of the armature.

Another advantage of the invention is to provide a brushed DC motor, wherein an inner end of the armature rotor is prevented from increasing friction with the motor shell while rotating so as to reduce heat generating due to friction and avoid increasing of operation temperature thereof.

Another advantage of the invention is to provide a brushed DC motor, wherein the brush cap comprises an electric layer connected with the brushes to conduct the electricity in a sunken manner that can protect the brushed DC motor and increase its serving life span.

Another advantage of the invention is to provide a brushed DC motor, wherein the brush cap comprises a base layer fastening the electric layer in a sunken manner for increasing durability of the brushes by reducing heat generated from the electric layer.

Another advantage of the invention is to provide a brushed DC motor, wherein the brush cap is capable of fastening the brushes therein that not only substantially maintains the position between the brushes and the commutator of the armature rotor, but also reduces possibilities of wearing down and welding of the brushes.

Another advantage of the invention is to provide a brushed DC motor, wherein the brush cap is adapted to be integrally coupled with the motor shell of the brushed DC motor.

Another advantage of the invention is to provide a brushed DC motor, wherein the thermal expansion of the plastic brush is solved to reduce the gap between the brush and the brush fastening frame and the bounce of the brush in the fastening frame which can reduce the noise of the motor and have more effective thermal transmission. With the fastening frame, the service life of the brush is improved and the sectional area of the brush is increased by more than 40%, and the length is increased by more 30%, so that the service life of the motor is improved. With integrated injection molding, the manufacture method of the motor is simple, stable, and reliable.

Another advantage of the invention is to provide a brushed DC motor, which comprises a motor plastic brush cap, an armature rotor, a motor shell and a stator (magnet). The motor plastic brush cap is arranged with an electric circuit layer, the fastening frame, a resilient element and the brush, wherein the fastening frame is made of metal and is integrally injection molded with the plastic brush cap as inserts. The magnet is fastened to inside the motor shell in an inserted piece manner.

Preferably, one end of the rotating shaft of the armature rotor is assembled on a central groove of the inner wall of the plastic brush cap with a wheel and a wheel chamber, while the other end of the rotating shaft of the armature rotor is assembled in a central hole of the motor shell to be extended to the outside.

Preferably, the motor shell comprises a plurality of lugs extended along the peripheral direction of assembly surface evenly to outside. The lugs have rivet holes and rivets. The plastic brush cap has mounting holes correspond to the rivet holes on the motor shell.

Preferably, the resilient element is vortex spring.

Preferably, the thickness of the motor shell is 2 mm.

The invention is solved problems of the thermal expansion of plastic brush holders to reduce the gap between the brush and the brush fastening frame, and the bounce of the brush in the fastening frame which can reduce the noise of the motor and have more effective thermal transmission to improve the service life of the brush. With the metal fastening frame, the sectional area of the brush is increased by more than 40%, and the length is increased by more 30%, so that the service life of the motor is improved. By integrated injection molding or ultrasonic welding, the manufacture method of the motor is simple, stable, and reliable.

Additional advantages and features of the invention will become apparent from the description which follows, and may be realized by means of the instrumentalities and combinations particular point out in the appended claims.

According to the present invention, the foregoing and other objects and advantages are attained by a brushed DC motor, comprising:

a motor shell which has a receiving cavity formed therein;

a stator fixed inside the motor shell;

an armature rotor mounted in the receiving cavity of the motor shell, wherein the armature rotor comprises an output shaft, a winding unit and a commutator; and a brush cap, arranged to cover the motor shell, comprising a base layer, an electric layer, a fastening frame, and at least one pair of brushes, wherein the brushes are fastened on the base layer in a sunken manner and electrically connected with the electric layer to conduct electricity to the commutator to drive the winding unit to rotate against the stator, wherein the brushes are positioned corresponding to the commutator symmetrically.

In one embodiment, the brushed DC motor further comprises a plurality of controlling cables electrically connected with the electric layer.

In one embodiment, the base layer further has a cable slot formed integrally for extending the controlling cables out of the brushed DC motor.

In one embodiment, the motor shell has an output opening provided at one end thereof for extending the armature rotor from the output opening to output rotation, wherein the motor shell comprises a sealing ring mounted around the output opening.

In one embodiment, the base layer further has a commutator chamber integrally formed in the base layer, wherein the commutator chamber is corresponding to the commutator for aligning the brushes to the commutator.

In one embodiment, the base layer further comprises a connector integrally formed on the base layer, wherein the brush cap and the motor shell are engaged by the connector.

In one embodiment, the electric layer further comprises a plurality of routes and at least one pair of connecting portions formed on the routes corresponding to the brushes respectively.

In one embodiment, the fastening frame further comprises a seat for storing the brushes, wherein the seat is shaped to hold the brushes securely inside.

According to the present invention, the foregoing and other objects and advantages are also attained by a manufacturing method of a brush cap of a brushed DC motor, comprising steps of:

(a) preparing a semi-finished base layer;

(b) positioning an electric layer and a fastening frame on the semi-finished base layer;

(c) molding to form the base layer with the electric layer and the fastening frame;

(d) connecting at least one pair of brushes to the electric layer and the fastening frame; and (e) connecting a plurality of controlling cables to the electric layer.

According to the present invention, the manufacturing method of the brush cap of the brushed DC motor further comprises a step of suppressing by plastic resin in one time.

According to the present invention, the manufacturing method of the brush cap of the brushed DC motor further comprises a step of molding by plastics resin in twice.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
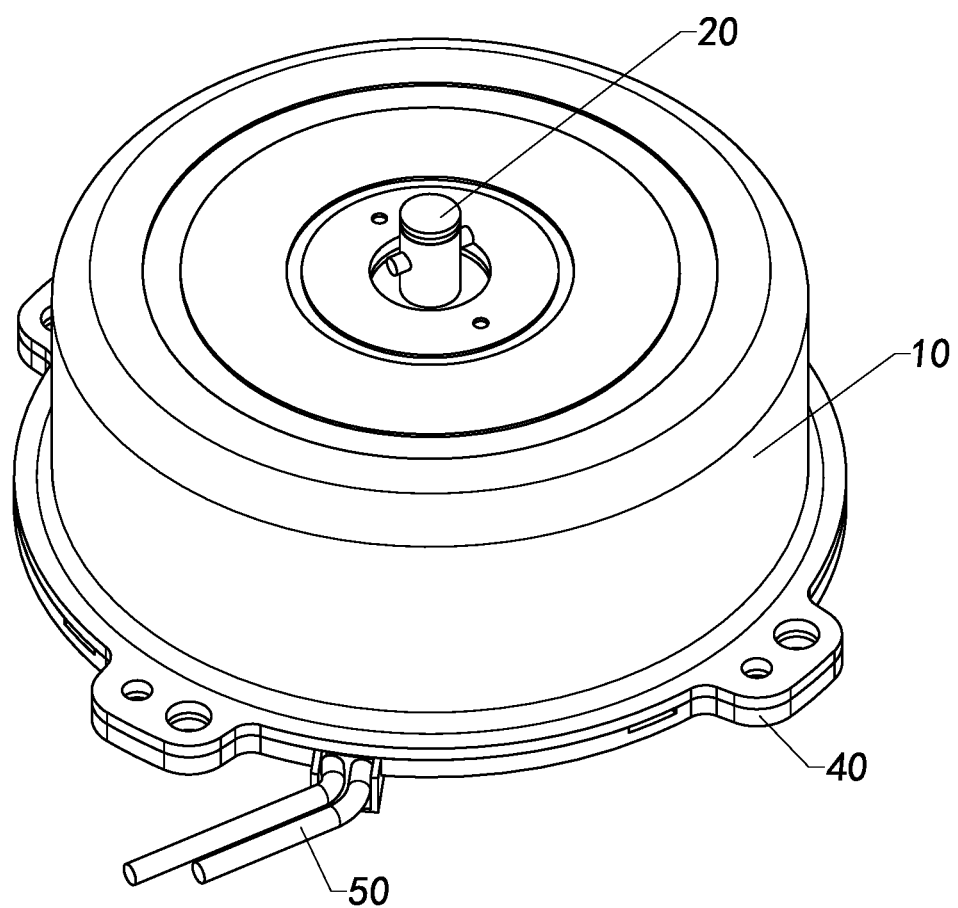
FIG. 1 is a top perspective view of a brushed DC motor according to a preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1 to FIG. 9, a brushed DC motor and a manufacturing method thereof according to a preferred embodiment of the present invention are illustrated. The brushed DC motor, in an inner rotor structure, comprises an armature rotor 20, a stator 30 and a brush cap 40, as shown in FIG. 8A and FIG. 8B, wherein the armature rotor 20 is disposed inside the stator 30 while forming a gap with magnetic field.

The brush cap 40 comprises at least one pair of brushes 44 conducting electricity with the armature rotor 20 to drive the armature rotor 20 to rotate against the stator 30 by changing conducting current in the brushes 44. In other words, as the armature rotor 20 is conducted with alternating current by the brushes 44, the armature rotor 20 is rotating against the stator 30.

The brushed DC motor according to the preferred embodiment of the present invention further comprises a motor shell 10 adapted to receive the armature rotor 20 therein. The stator 30 is fixed on an inner surface of an inner surrounding wall 101 of the motor shell 10 in position in a permanent way that a magnetic field is formed between the stator 30 and the armature rotor 20. It is worth to mention that the motor shell 10 has a cup shape and an installing opening 13 provided at one end adapted to be covered by the brush cap 40 to assemble the brushed DC motor of the present invention.

Figure 2:
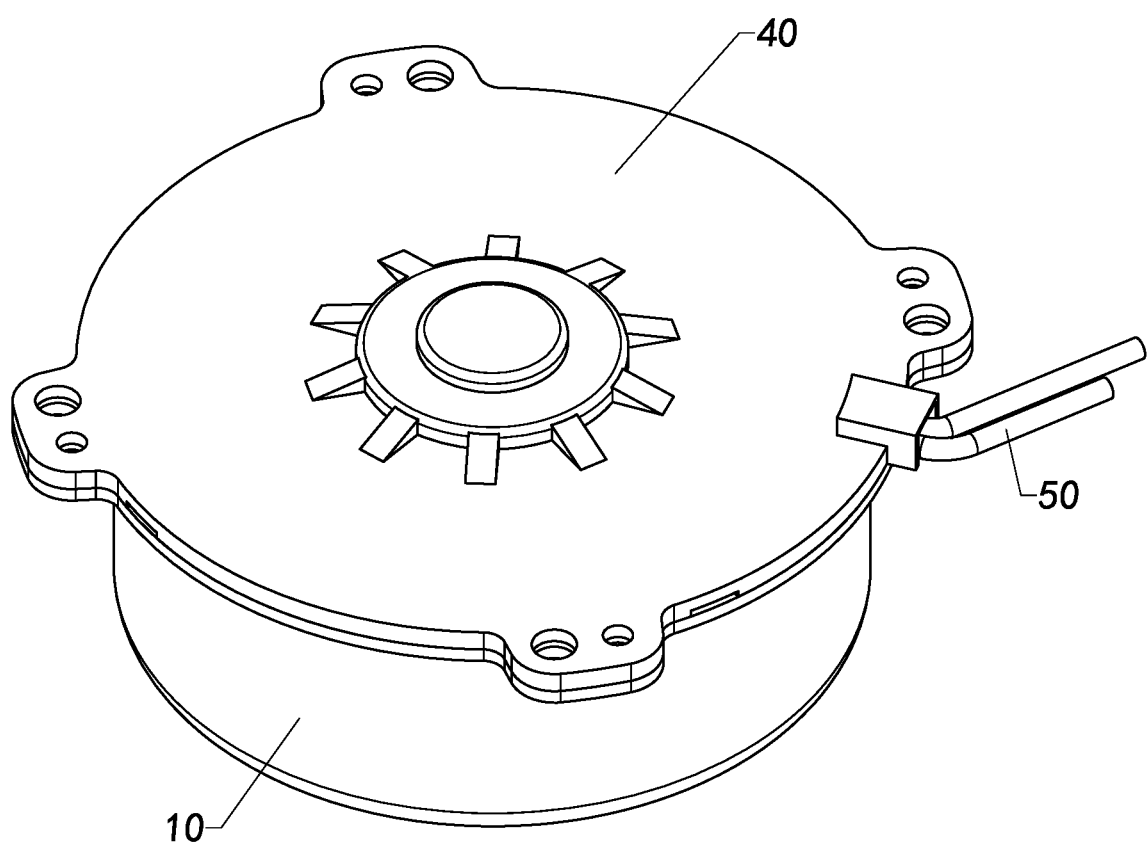
FIG. 2 is a bottom perspective view of the brushed DC motor according to the above preferred embodiment of the present invention.
Figure 3:
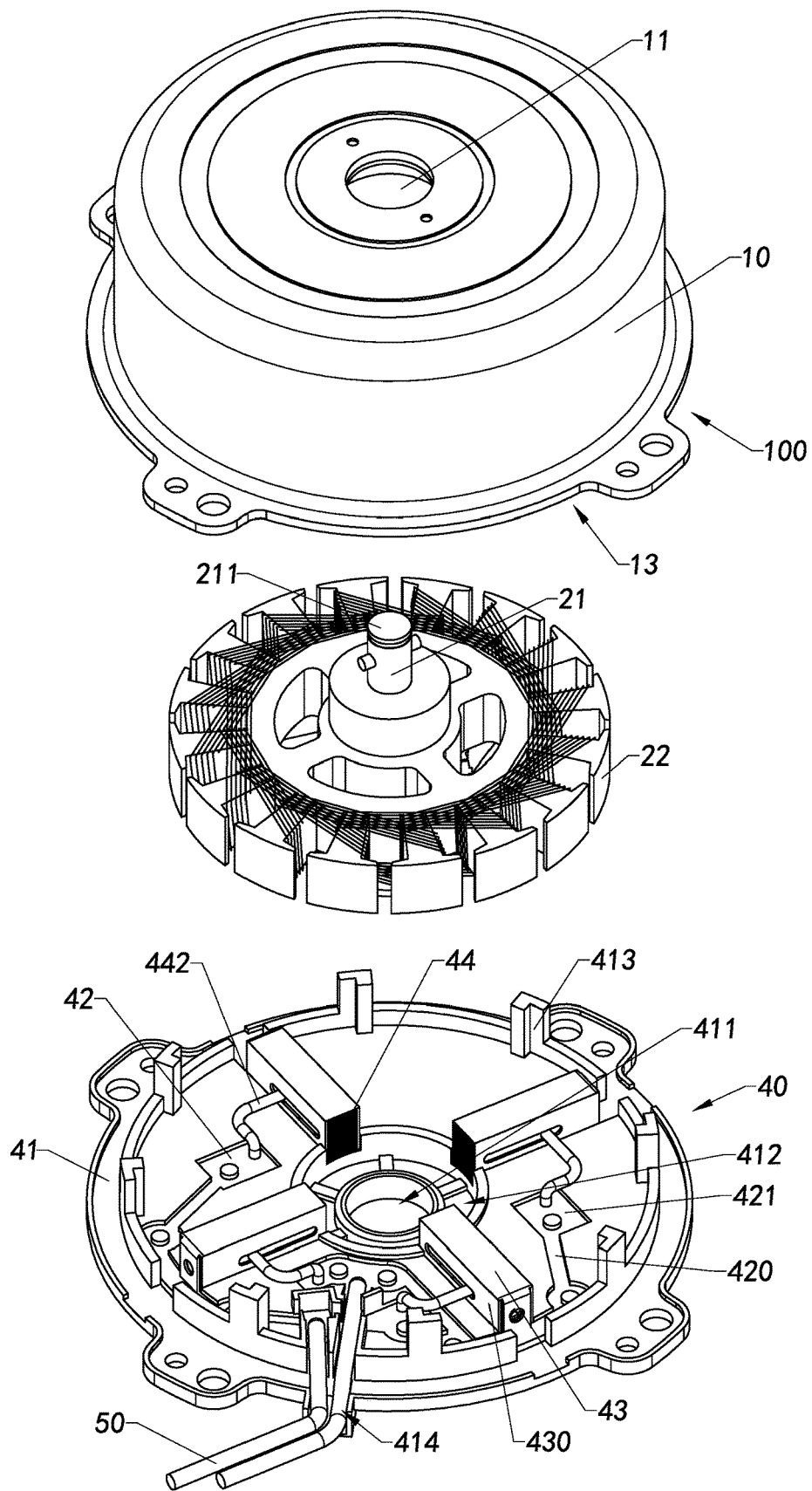
FIG. 3 is an exploded top perspective view illustrating the armature rotor of the brushed DC motor according to the above preferred embodiment of the present invention.

As shown in FIG. 2 and FIG. 3, the motor shell 10 has a receiving cavity 100 formed therein, wherein the inner surrounding wall 101 of the motor shell 10 is adapted to install the stator 30 and the armature rotor 20 within the receiving cavity 100. The motor shell 10 further has an output opening 11 provided at another end of the motor shell 10 for an output shaft 21 of the armature rotor 20 to extend therethrough for outputting driving rotation without rotating the motor shell 10.

The stator 30 comprises at least one pair of magnets 31 to provide the magnet field for the winding unit 22, rendering the brushed DC motor a permanent magnetic motor. Person skilled in the art may easy to modify the stator 30 with at least one field winding, rendering the brushed DC motor an induction motor.

Figure 4:
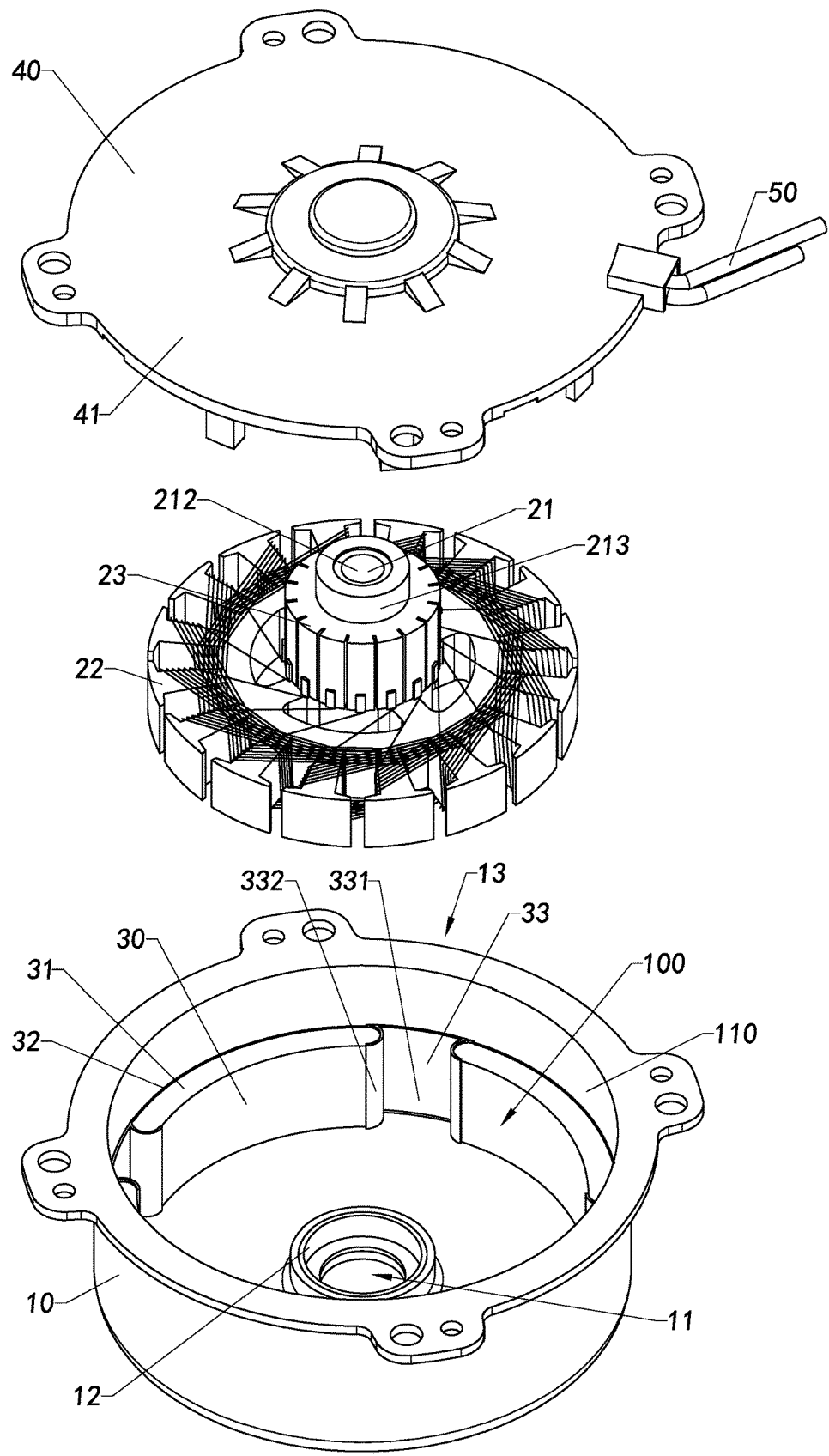
FIG. 4 is an exploded bottom perspective view illustrating the brush cap of the brushed DC motor according to the above preferred embodiment of the present invention.
Figure 8A:
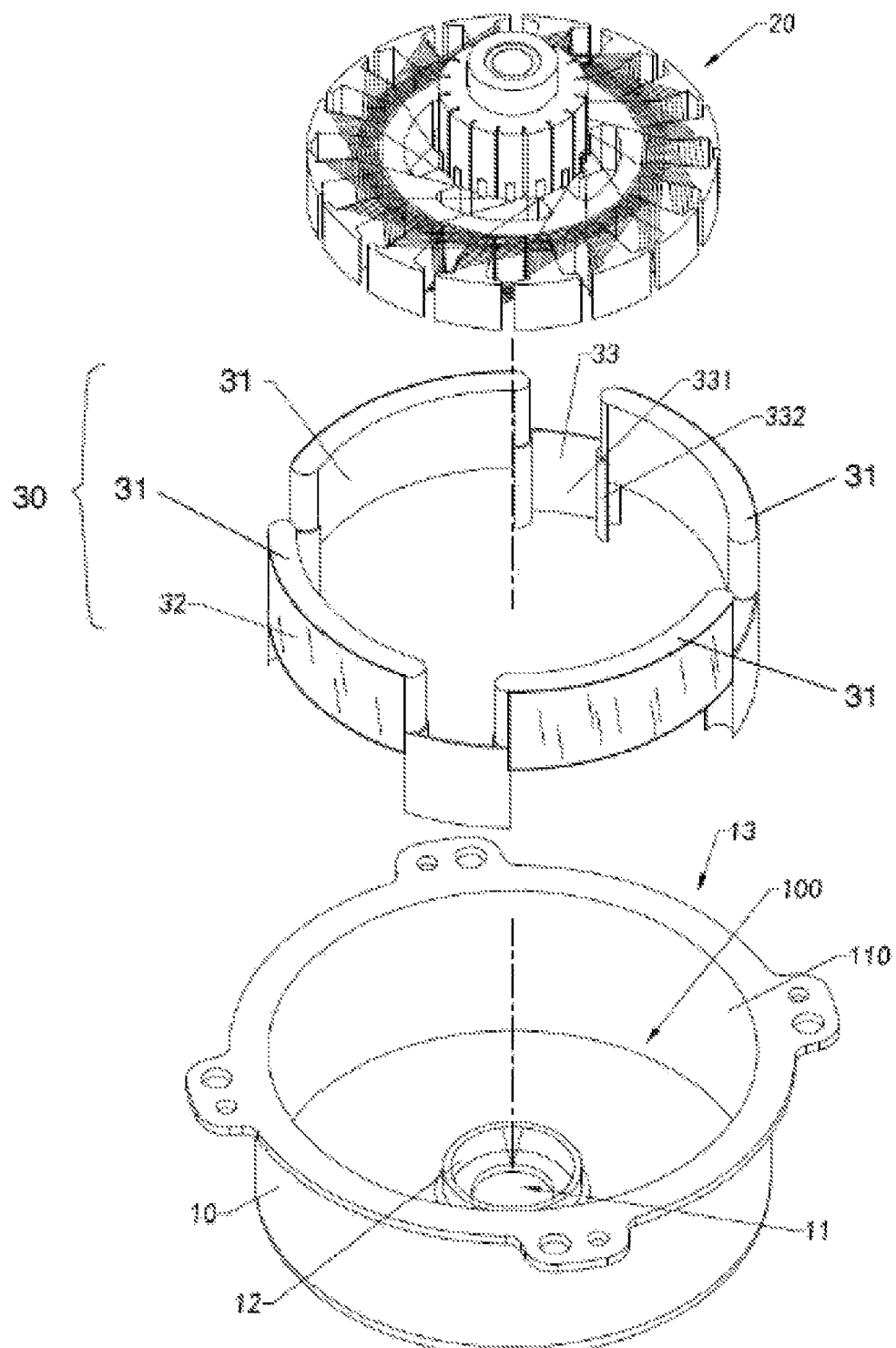
FIG. 8A and FIG. 8B are perspective views illustrating a manufacturing method of the brushed DC motor according to the above preferred embodiment of the present invention.
Figure 8B:
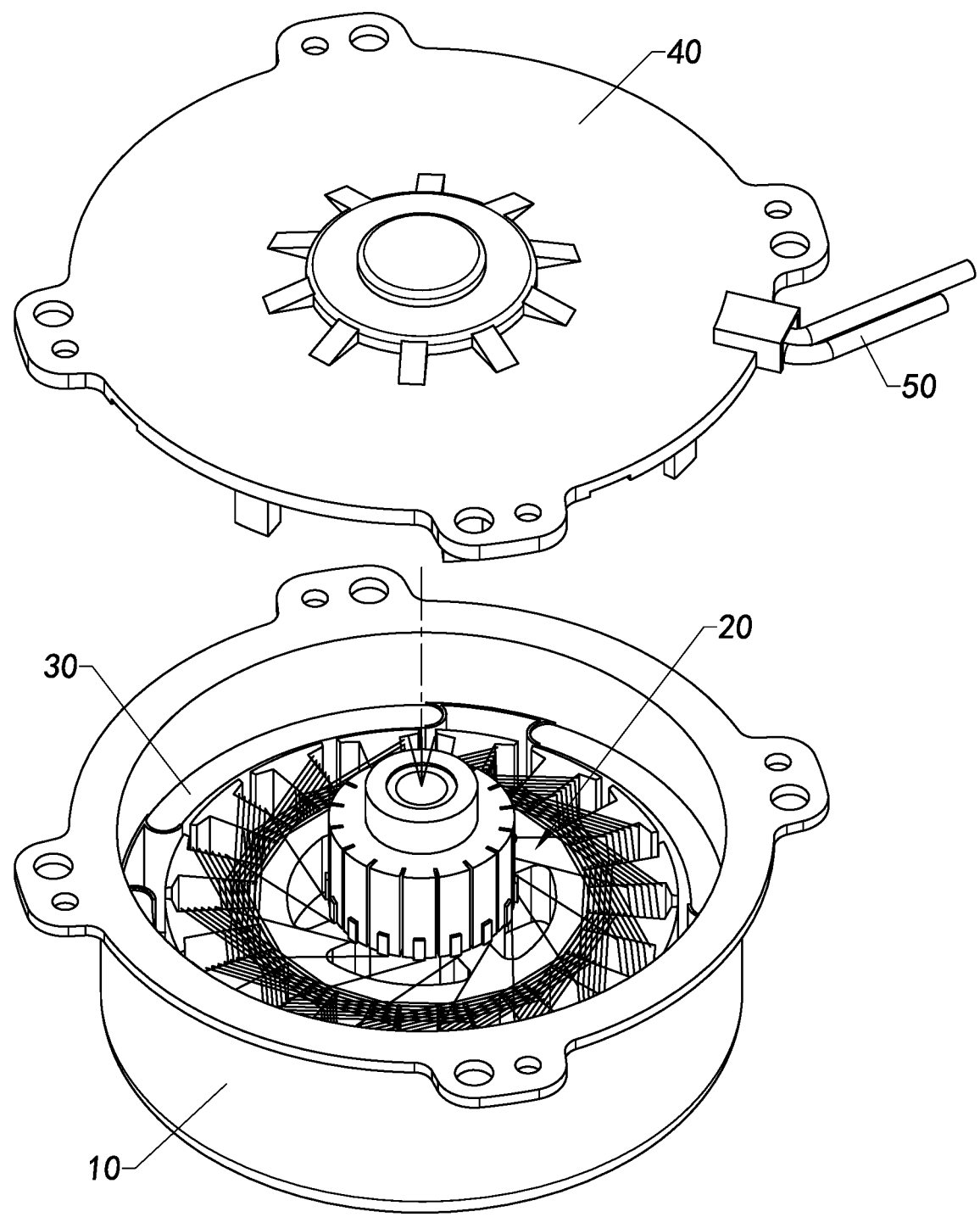

According to the preferred embodiment of the present invention, referring to FIG. 4, FIG. 8A and FIG. 8B, the stator 30 comprises two pairs of magnets 31, each having an arc shape, and an affixing device 32 provided around the inner surrounding wall 101 of the motor shell 10 to fittingly mount the four magnets 31 intervally around the inner surrounding wall 101 of the motor shell in an end to end manner. The affixing device 32 substantially holds the four magnets 31 in position in a symmetrical end to end manner around the inner surrounding wall 101 of the motor shell 10 while four equal interval spaces 321 are formed between the ends of the four magnets 31 respectively.

According to the preferred embodiment of the present invention, the affixing device 32 comprises four dividers 33 for mounting each of the four magnets 31 between two of the dividers 33. Each of the dividers 33 comprises a supporting member 331 and two holders 332 integrally connected at two ends of the supporting member 331 respectively, wherein each of the holders 332 is structured and shaped for holding on an end portion of the magnet 31. Accordingly, by means of the four dividers 33, the two pairs of magnets 31 are symmetrically and intervally mounted around the inner surrounding wall 101 of the motor shell while defining the receiving cavity 100 therebetween, wherein the length of each divider 33 also equal to that of the interval space 321 such that the four dividers 33 form the four equal interval spaces 321 between the magnets 31.

In the preferred embodiment, each of the supporting members 331 is made of an arc-shaped metal plate having a curvature equal to that of each of the magnets 31 and each of the holders 332 has a C-shaped adapted for fittingly holding on the round shaped end portion of the magnet 31, such that when the two pairs of magnets 31 are mounted by the four dividers 33, the four magnets 31 and the four dividers 33 form a circular ring having a diameter and circumference matching with the diameter and circumference of the receiving cavity 100 so as to fittingly mount the magnets 31 symmetrically and intervally around the inner surrounding wall 101 of the motor shell 10, as shown in FIGS. 4, 8A and 8B. Each of the arc-shaped supporting members 331 functions as a resilient element providing a resilient force to hold the magnets 31 against the inner surrounding wall 101 of the motor shell 10. Therefore, by means of the dividers, the brushed DC motor according to the preferred embodiment of the present invention does not require any complicated mounting structure or application of adhesive to affix the magnets in position, but simply aligning the magnets 31 around the inner surrounding wall 101 of the motor shell 10 and dividing and holding the magnets 31 in position by the dividers 33.

Figure 9:
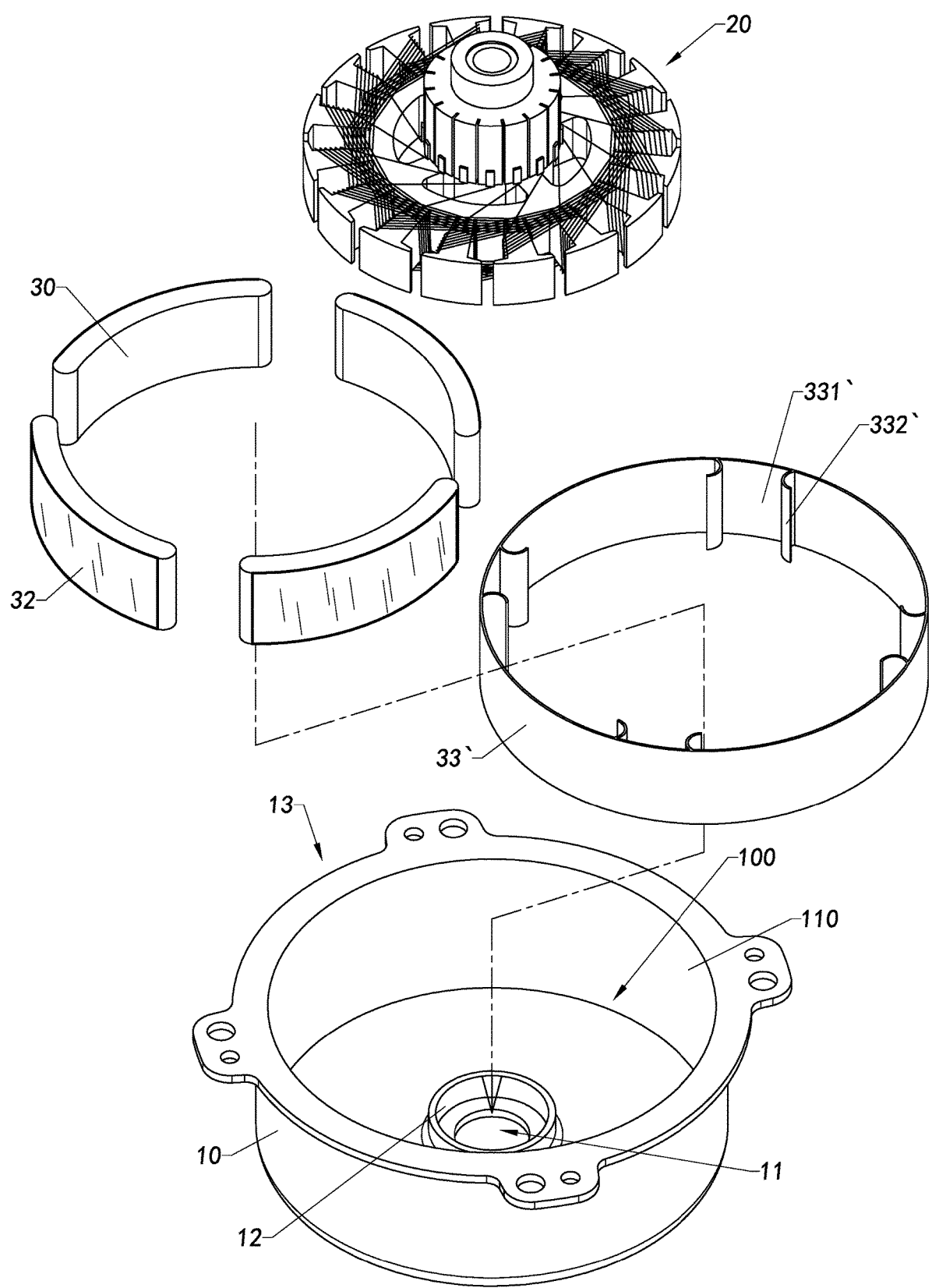
FIG. 9 is a perspective view illustrating an alternative mode of the motor shell of the brushed DC motor according to the above preferred embodiment of the present invention.
Figure 10:
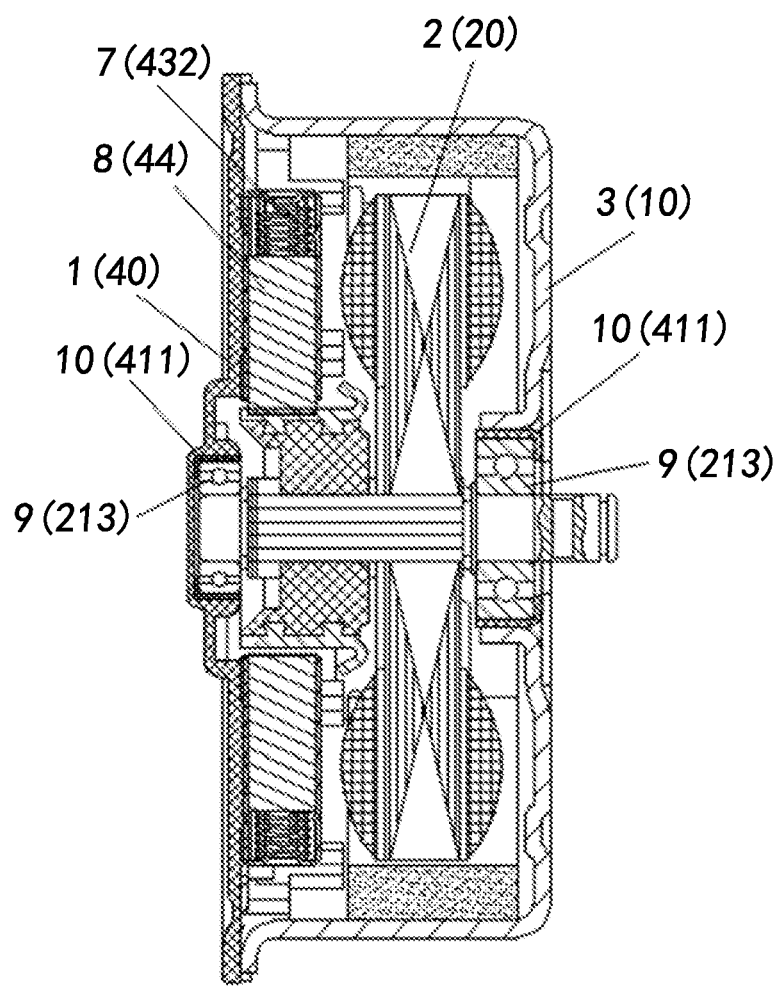
FIG. 10 is a sectional view of the brushed DC motor according to the above preferred embodiment of the present invention.
Figure 11:
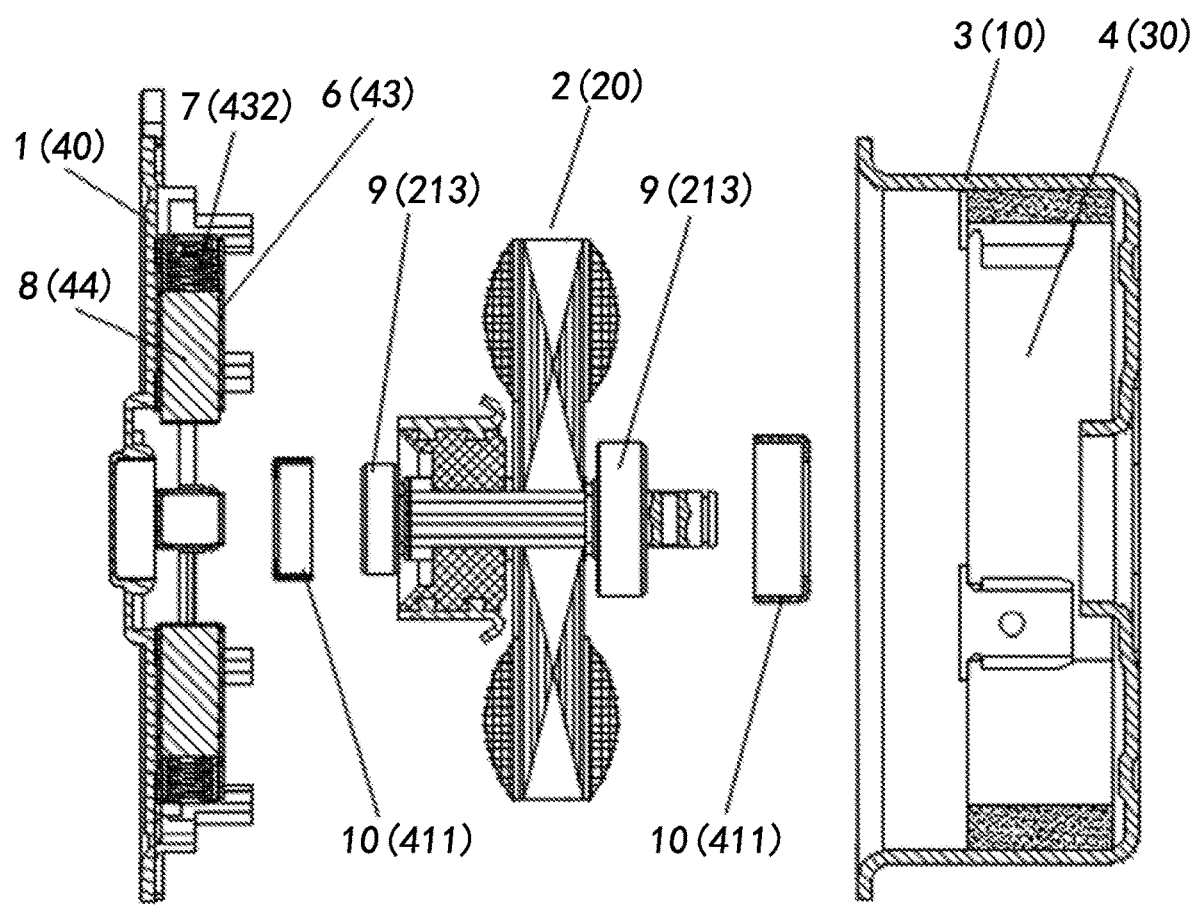
FIG. 11 is an exploded perspective view of FIG. 10 of the brushed DC motor according to the above preferred embodiment of the present invention.
Figure 12:
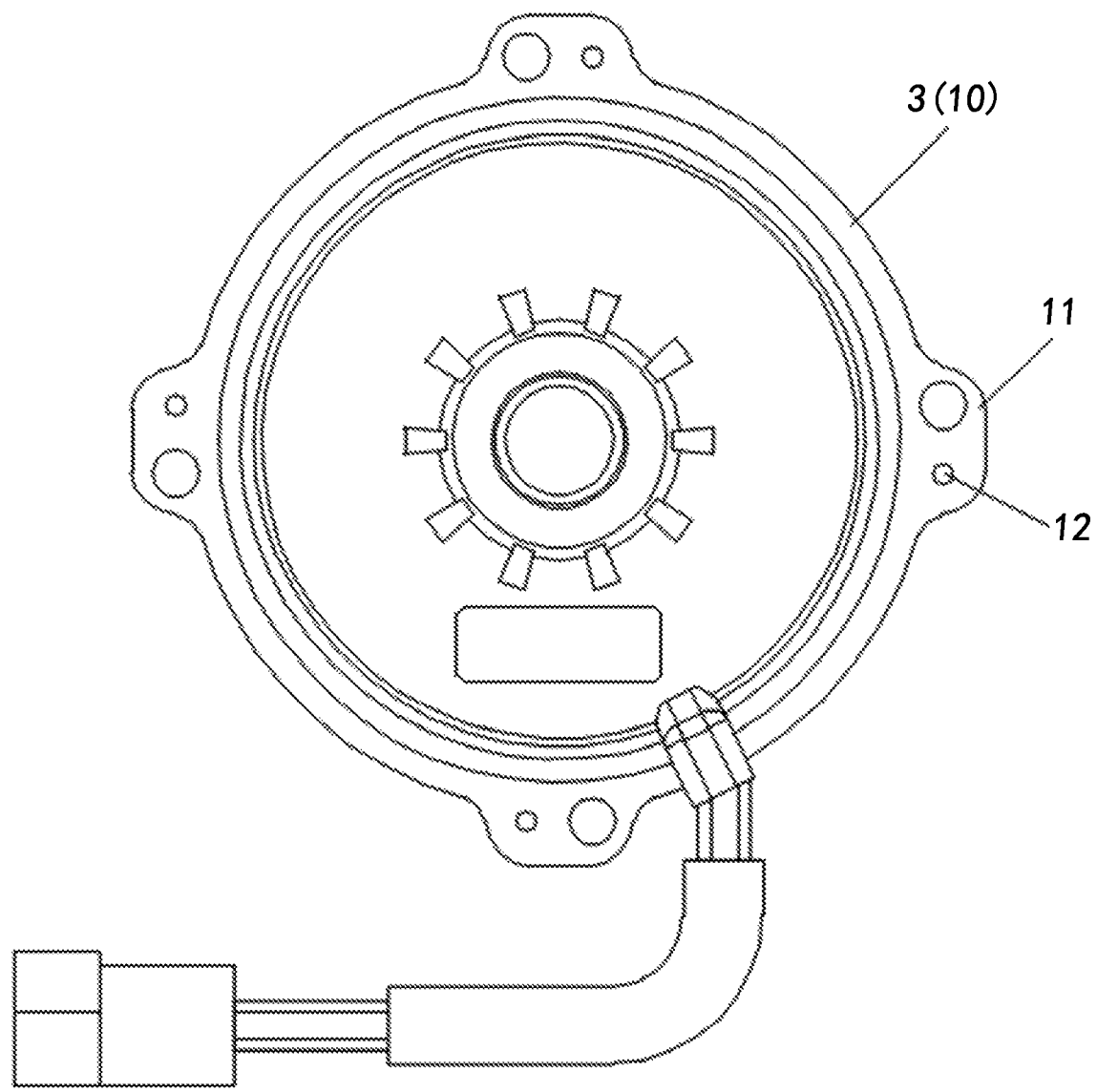
FIG. 12 is a perspective view of the shell of the brushed DC motor according to the above preferred embodiment of the present invention.
Figure 13:
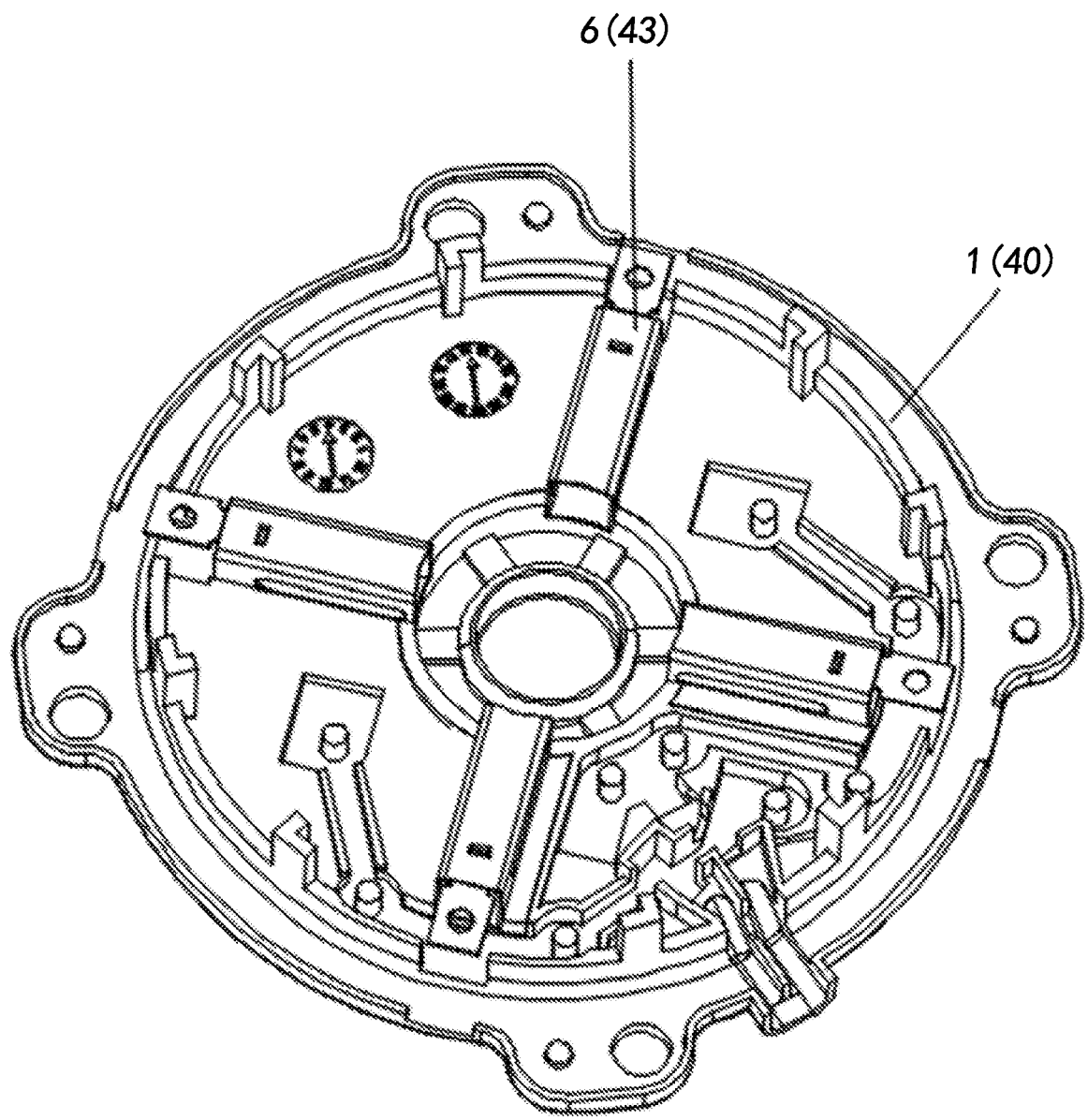
FIG. 13 is a perspective view of the brush cap of the brushed DC motor according to the above preferred embodiment of the present invention.
Figure 14:
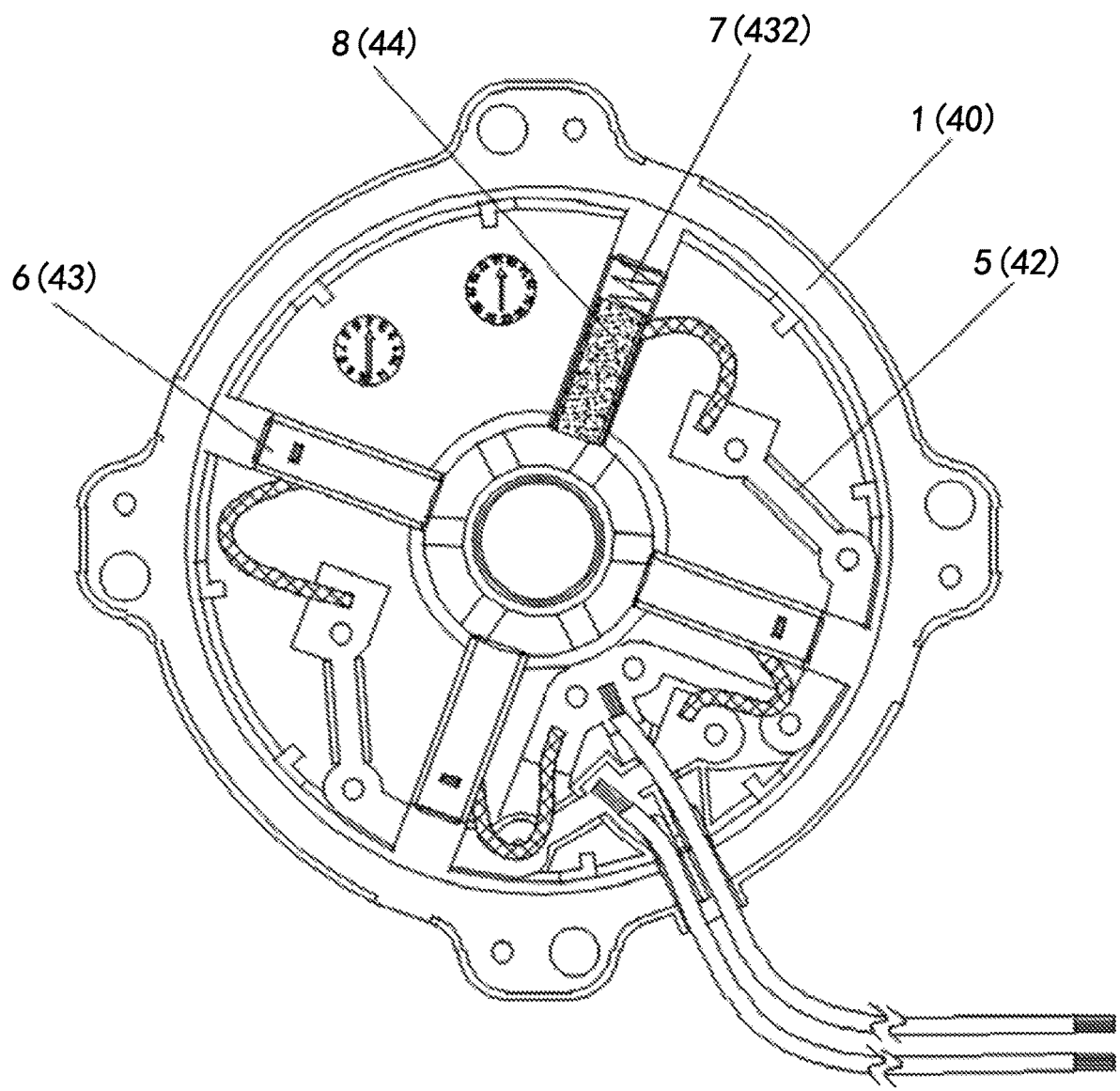
FIG. 14 is a perspective view of a brush of the brushed DC motor according to the above preferred embodiment of the present invention.

It is worth mentioning that person skilled in the art may understand that the four arc-shaped supporting members 331 of the four dividers 33 can be substituted by a circular metal plate to form a divider ring 33' having the same circumference of the inner surrounding wall 101 of the motor shell 10 and the four pairs of C-shaped holders 332' are integrally formed on the inner circumferential surface of the divider ring 33 for holding the two pairs of magnets 31 in position symmetrically and intervally around the inner surrounding wall 101 of the motor shell 10, as shown in FIG. 9

Furthermore, the motor shell 10 comprises a sealing ring 12 mounted around the output opening 11 to seal the receiving cavity 100 and prevent any outside influence to the receiving cavity 100 through the output opening 11, as shown in FIG. 4. Especially, when the brushed DC motor is running, the sealing ring 12 substantially prevents liquid, such as water, from flowing along the armature rotor 20 and through the output opening 11 that may cause damages to the electrical function of the brushed DC motor. With the sealing ring 12 mounted around the output opening 11, the end of the motor shell 10 having the output opening 11 is well sealed for operation of the brushed DC motor in a moisture environment and protection of the electrical components therein. It is also worth to mention that one end of the armature rotor 20 is capable of outputting rotation driving through the output opening 11, by means of the output shaft 21 according to the preferred embodiment of the present invention, and the other end of the armature rotor 20 is kept inside the motor shell 10 which enables the brushed DC motor being adapted to run near or in moisture environment.

As mentioned above, the installing opening 13 of the motor shell 10 is adapted to be coupled with the brushed cap 40 which substantially covers the installing opening 13 and closes the receiving cavity 100 so as to enclose the armature rotor 20 and the brushes 44 inside the receiving cavity 100. During assembling the brushed DC motor, it is more convenient to install the armature rotor 20 into the receiving cavity 100 through the installing opening 13, and that the installation of the brushes 44 is also more convenient by simply coupling the brush cap 40 sealingly to cover the installing opening 13 of the motor shell 10.

The armature rotor 20, according to the preferred embodiment of the invention, as shown in FIG. 3 and FIG. 4, which is rotatably disposed inside the receiving cavity 100 of the motor shell 10 and surrounded by the stator 30 forming the gap therebetween with magnetic field, comprises the output shaft 21, a winding unit 22 wound with an electrical coil 221 and set around the output shaft 21 for conducting electrical current to generate a magnetic field around the armature rotor 20, and a commutator 23 electrically connected with the winding unit 22 correspondingly to drive the winding unit 22 and the output shaft 21 to rotate against the stator 30. When the electrical coil 221 is powered, a magnetic field is generated around the armature rotor 20. A corresponding side portion of the armature rotor 20 is pushed away from the adjacent magnet 31 and drawn toward a direction, causing rotation.

The output shaft 21 of the armature rotor 20 has an output end 211 and an inner end 212. The output end 211 of the output shaft 21 is extended outwardly through the output opening 11 of the motor shell 10 to expose outside to provide driving rotation. The inner end 212 is extended inwardly in the motor shell 10. As the output shaft 21 is rotating with the winding unit 22, the output end 211 is adapted to engage with one or more predetermined components by means of such as bearing to drive the engaged component to rotate integrally. The inner end 212 may also rotate with the output shaft 21 but not providing working torque. It is worth mentioning that the output shaft 21 is preferred to be made of metal or alloy to provide output torque.

Furthermore, the output shaft 21 further comprises a wheel 213, such as a bearing, mounted on the inner end 212 and seated in a wheel chamber 411 provided at a center portion of the brushed cup 40 that enables the inner end 212 of the output shaft 21 to be rotatable mounted on the brush cap 40 while decreasing the friction between the inner end 212 and the motor shell 10. The wheel 213 provides a buffering effect to the rotatable inner end 212 of the output shaft 21 with respect to the motor shell 10, that may also decrease the heat generated by the rotating inner end 212.

As shown in FIG. 4, the wheel 213 is mounted on the output shaft 21 near the commutator 23 according to the preferred embodiment. The wheel 213 also helps the output shaft 21 to rotate more smoothly against the motor shell 10 and to conduct electrical current by the commentator 23. The winding unit 22 is conducted with electrical current to interact with the magnetic field (magnetic flux) in the air-gap provided between the winding unit 22 and the stator 30.

It is worth mentioning that the winding unit 22 of the armature rotor 20 is rotated by changing conducted electrical current, i.e. by changing the operating voltage or the strength of the magnetic field, via the brush 44 to the commutator 23. Depending on the connections of the field to the power supply the speed and torque characteristics of the brushed DC motor can be altered to provide steady speed or speed inversely proportional to the mechanical load.

Figure 5:
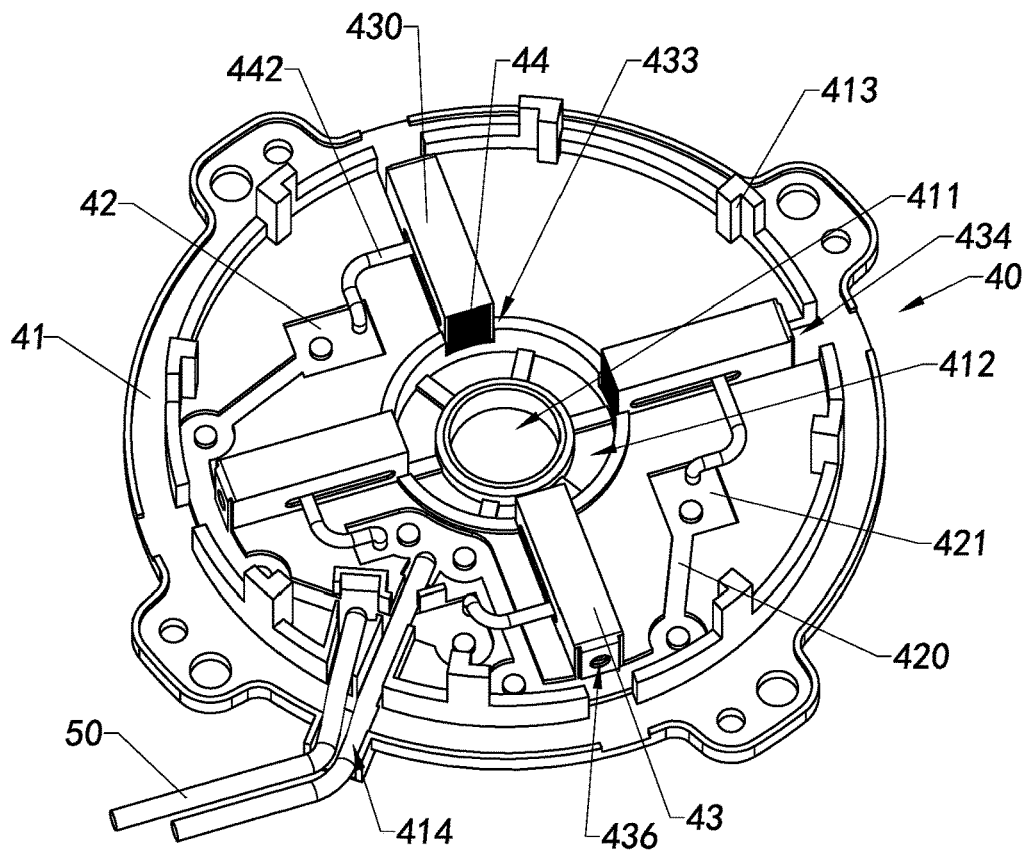
FIG. 5 is a perspective view of the brush cap of the brushed DC motor according to the above preferred embodiment of the present invention.

According to the preferred embodiment, each of the brushes 44 is fastened on the brush cap 40 in a sunken manner, as illustrated in FIG. 5. The brush cap 40 comprises a base layer 41, an electric circuit layer 42, and a plurality of brush frames 43 to store the brushes 44 respectively. Preferably, the brush frames 43 are made of metal. When a pair of magnets 31 is used, a pair of brush frames 43 is provided to hold a pair of brushes 44 in opposing position. According to the preferred embodiment, two pairs of magnets 31 is used, two pairs of brush frames 43 are provided and arranged in a symmetrical and perpendicular manner, so as to position the two pairs of brushes 44 corresponding to the commutator 23. Each of the brush frames 43 has a tubular frame body 430, having a generally square cross section and a brush chamber 431 defined therein for receiving one of the brushes 44 therein, an inner open end 433 facing a center portion of the base layer 41, an outer close end 434 radially extended outwardly, and an elongated guiding slot 435 extended along one side of the tubular frame body 430, wherein a setting hole 436 is formed in the outer close end 434 adapted for installing and adjusting the respective brush 44 in the frame body 430.

The electric circuit layer 42 is provided on the base layer 41 which forms four symmetrical and perpendicular fixing grooves 410 for positioning the four brush frames 43 respectively, so that the brush frames 43 fitted in the fixing grooves 410 respectively can be molded with the base layer 41 integrally while molding the base layer 41 and the electric circuit layer 42 together so as to fasten the brush frames 43 in position, according to the preferred embodiment of the present invention. Of course, it is apparent that the electric circuit layer 42 can be affixed on the base layer 41 by alternative means with the fixing grooves 410 provided, and then, alternatively, the brush frames 43 can be affixed in said fixing grooves 410 respectively by means of adhering, welding, or the like.

Figure 6:
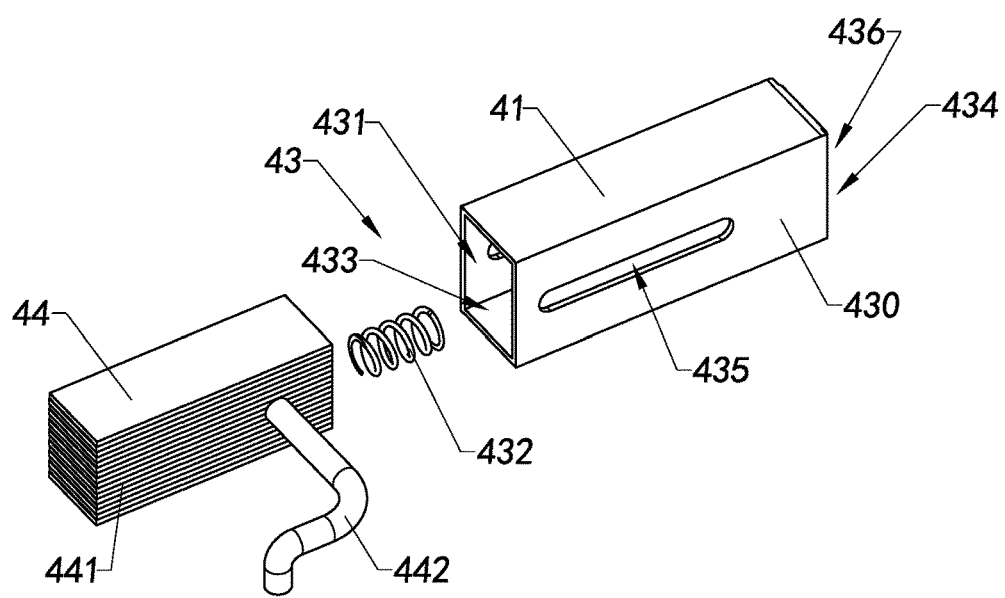
FIG. 6 is an exploded view of a brush of the brushed DC motor according to the above preferred embodiment of the present invention.
Figure 7A:
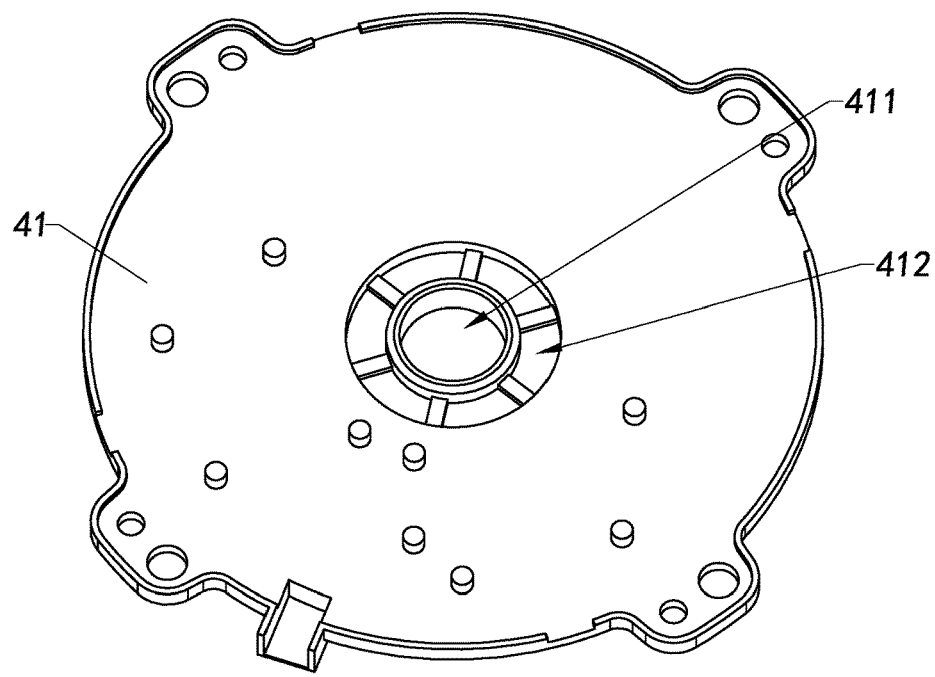
FIG. 7A to FIG. 7E are perspective views illustrating a manufacturing method of the brush cap of the brushed DC motor according to the above preferred embodiment of the present invention.
Figure 7B:
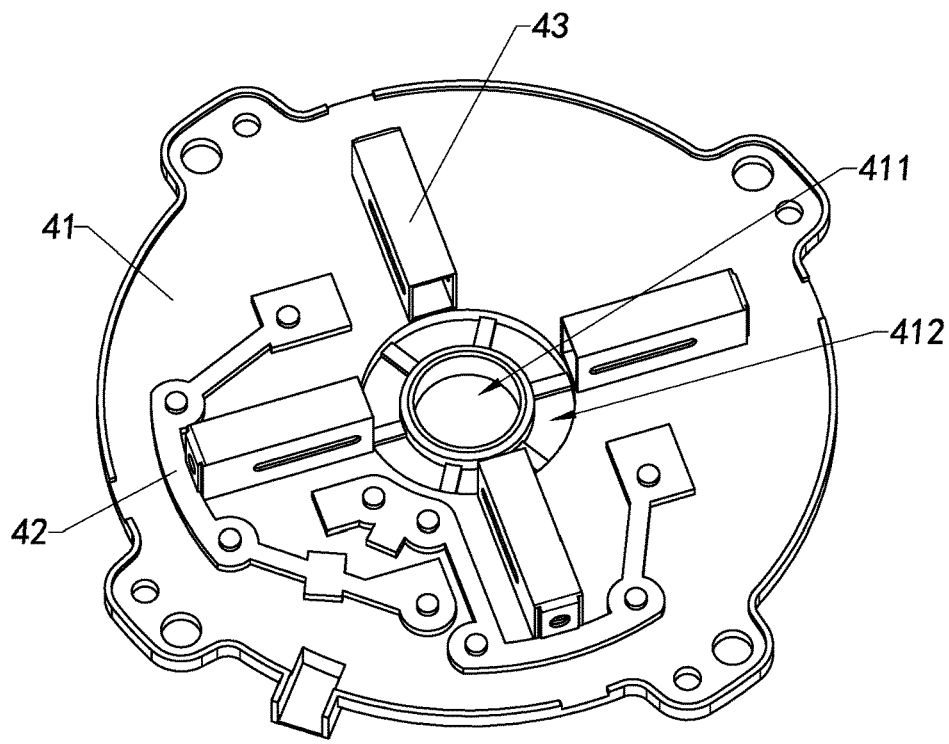
Figure 7C:
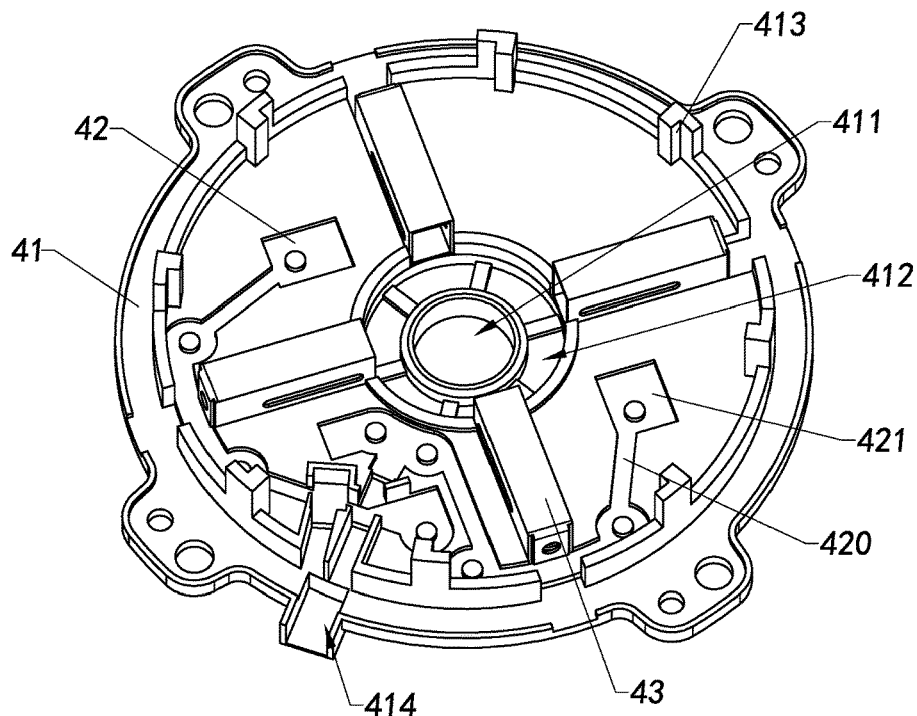
Figure 7D:
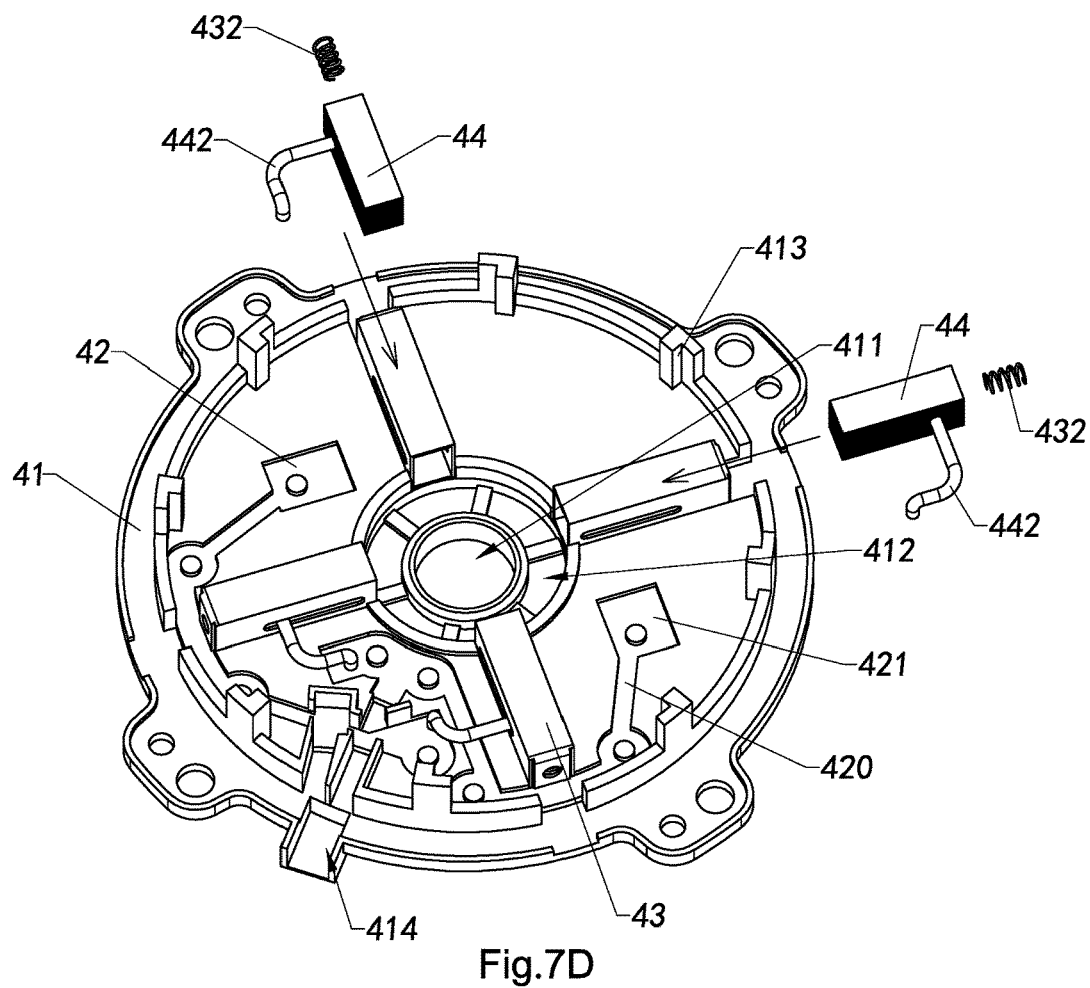
Figure 7E:
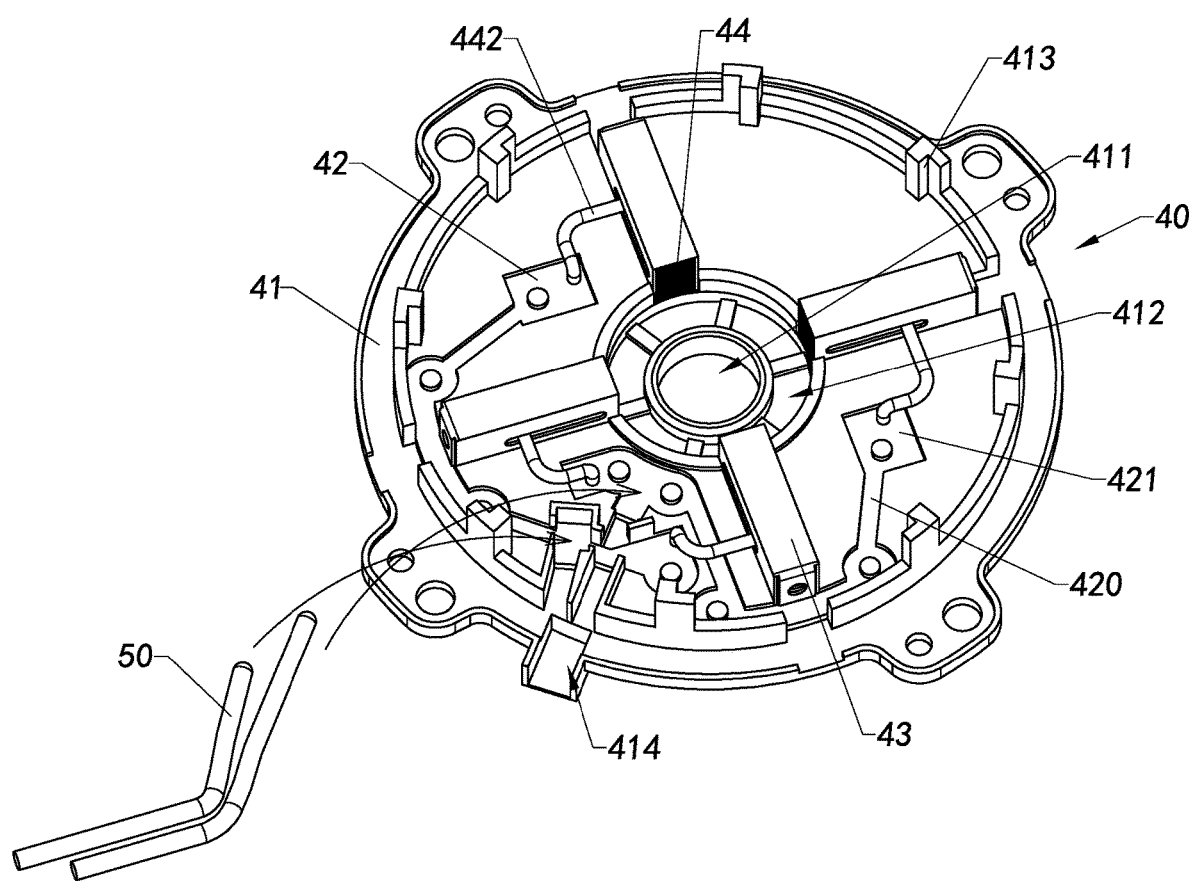

Referring to FIG. 6, each of the bushes 44 comprises a brush body 441 inserted in the corresponding brush body 430 of the brush frame 43 and a brush wire 442 having one end connected to the brush 44 and another end extended out of the frame body of 430 the brush frame 43 through the guiding slot 435 to electrically connected with the electric circuit layer 42. Each of the brush frames 43 further comprises a resilient element 432 such as a spring received in the corresponding frame body 430, wherein an outer end of the spring 432 is pressed against an inner surface of the outer close end 434 of the frame body 430 and another inner end is pressed against an outer end of the brush body 441 so as to apply an inward pressing force to the brush body 441.

Referring to FIG. 5, the base layer 41 has a wheel chamber 411 formed in a center position and a commutator chamber 412 formed around the wheel chamber 411 coaxially. Furthermore, the base layer 41 comprises one or more connectors 413 protruded from an outer circular portion the base layer 41 for connecting the brush cap 40 with the motor shell 10. In other words, the brush cap 40 is engaged with the motor shell 10 by the connectors 413 so as to cover the installing opening 13 of the motor shell 10. Accordingly, the brush cap 40 can easily be detached from the motor shell 10 to open the motor shell 10 and separate the brushes 44 and the armature rotor 20.

According to the preferred embodiment, the wheel chamber 411, the commutator chamber 412 and the connector 413 are integrally formed on the base layer 41. The wheel chamber 411 is positioned corresponding to the wheel 213 of the shaft 21 for receiving the wheel 213 in the wheel chamber 411. And, the wheel chamber 411 provides a space for the rotation of the wheel 213 and the dissipation of the heat generated by the wheel 213. With the heat dissipation ability, not only the armature rotor 20 has a smoothly rotating performance, the life span of the armature rotor 20 and the brush cap 40 has been increased.

The commutator chamber 412 is formed corresponding to the commutator 23 for aligning the brushes 44 to the commutator 23 to provide efficient connection. The brush frames 43 are positioned around the commutator 412 in such a manner that the brushes 44 are positioned to ensure in touch with the commutator 23. Furthermore, each of the springs 432 disposed in the respective frame body 430 provides a pressing force against the brush body 441 received in the frame body 430 inwardly respectively so as to push the inner end of the brush body 441 of the brush 44 to remain in touch with the commutator 23. Since the commutator chamber 412 is made integrally in the base layer 41, the positions between the frame bodies 430 and the commutator 23 are predetermined and arranged to ensure installation precision and production efficiency, wherein proper positions between the brushes 44 and the commutator 23 can substantially prevent brush damaging and potential welding of the brushes 44 to the commutator 23.

It is worth mentioning that the frame bodies 430 are shaped to hold the brushes 44 securely inside the frame bodies 430 without exposing the brushes 44 too much. In addition, when the inner end of the brush bodies 441 which pressing against the commutator 23 being worn out, the springs 432 not only provide pressing force to push the inner end of the brush bodies 441 of the brushes 44 to remain in contact with the commutator 23, but also push the brush bodies 441 of the brushes 44 inwards to compensate any wearing out of the brush bodies 441 while the brush wires 442 are able to be moved inwardly therewith along the guiding slots 435 of the frame bodies 430 respectively.

According to the preferred embodiment, the base layer 41, can be made of plastic resin, further comprises a cable slot 414 formed integrally at a side thereof. The cable slot 414 is adapted to receive one or more controlling cables 50 extended from outside into the brush cap 40. In addition, the electric circuit layer 42 is affixed on the base layer 41 with one or more predetermined portions exposed on the base layer 41. Preferably, the base layer 41 is made in molding integrally with the electric circuit layer 42 disposed therein. Accordingly, the electric circuit layer 42 is permanently fixed with the base layer 41 to enhance the connection between the brushes 44 and the controlling cables 50. The electric circuit layer 42 is preferably made in strips of metal according to the requirement of the connection between the brushes 44 and the controlling cables 50. In strips, the overheating in connection is able to be avoid with excellent heat dissipation.

The electric circuit layer 42 further comprises a plurality of routes 420 and at least one pair of connecting portions 421 formed on the routes 420 with respect to the brushes 44. The routes 420 are capable of conducting current from the controlling cables 50 to the brushes 44 with one of the connecting portions 421 connecting the controlling cables 50 and another the connecting portion 421 connecting the brushes 44. One skills in the art will understand that the shape of the routes 420 and the positions of the connecting portions 421 are depending on the design of the electrical requirement.

According to the preferred embodiment, as the brush bodies 441 of the brushes 44 are installed in the frame bodies 430 in position respectively, the brush wires 442 of the brushes 44 are connected to the connecting portions 421 provided on the routes 420 of the electric circuit layer 42 correspondingly that leads the current passing through the controlling cables 50, the routes 420 of the electric circuit layer 42, the connecting portions 421, the brush wires 442 and the brush bodies 441 to the commutator 23 accordingly.

According to the embodiment, the electric circuit layer 42 and the brush frames 43 are fixed on the base layer 41 in a sunken manner. The electric circuit layer 42 and the brush frames 43 are stuffed in the base layer 41 which substantially reduces a thickness of the brush cap 40. With injecting molding or equivalent technology, the electric circuit layer 42 and the brush frames 43 can be disposed lower than the top surface of the base layer 41.

Accordingly, the brushes 44 are electrically connected with the electric circuit layer 42 to receive current and conduct to the commutator 23 to drive the winding unit 22 to rotate. It is worth to mention that the electric circuit layer 42 is fully supported by the base layer 41 for keep the electric path in stable while operating. The controlling cables 50 are electrical connected with the electric layer 42 for control the operation of the brushed DC motor. Therefore, as the controlling cables 50 connected to the power source provide current to operate the brushed DC motor, the electric circuit layer 42 conducts the current to the brushes 44 which are installed in the brush frames 43.

Referring to FIG. 7A to FIG. 8B, a manufacturing method of brushed DC motor as described above is illustrated.

Firstly, referring to FIG. 7A to FIG. 7E, manufacture the brush cap 40 of the brushed DC motor with the following steps:

(a) molding the electric circuit layer 42 on the semi-finished base layer 41 with two or more brush frames 43 affixed thereon in a sunken manner, wherein the brush frames 43 are arranged symmetrically with an inner open end 433 of each of the frame bodies 430 of the brush frames 43 facing a center portion of the base layer 41 and an outer close end 434 radially extended outwardly;

(b) installing the brush bodies 441 of the brushes 44 inside the frame bodies 430 of the brush frames 43 with the brush wires 442 of the brushes 44 extended out through the elongated guiding slots 435 of the frame bodies 430 of the brush frames 43 respectively;

(c) electrically connecting the brush wires 442 to the electric circuit layer 42; and (d) electrically connecting the controlling cables 50 to the electric circuit layer 42.

Before the step (a), the manufacturing method of the brush cap 40 further comprises a step of positioning the frame bodies 431 and the routes 420 on the surface of the semi-finished the base layer 41.

During the step (a), the commutator chamber 412 and the connectors 413 are integrally formed on the base layer 41.

Referring to FIG. 8A to FIG. 8B, after the brush cap 40 is made by the steps (a) to (d), the manufacturing method the brushed DC motor further comprises the steps of:

(i) mounting the armature rotor 20 to the motor shell 10 with the stator 30; and (ii) connecting the brush cap 40 with the motor shell by covering and fastening the brush cap 40 to the installing opening 13 of the motor shell 10.

In the step (i), the armature rotor 20 is mounted with the output end 211 of the output shaft 21 extended through the output opening 11 of the motor shell 10 while the inner end 212 of the output shaft 21 positioned in the motor shell 10 and rotatably affixed by the brush cap 40 covered at the installing opening 13 of the motor shell 10. Also, the sealing ring 12 provided around the output opening 11 of the motor shell 10 is capable of sealing and blocking moisture from the inside of the motor shell 10.

A description of the invention is as follows with drawing.

As shown in FIGS. 10 to 14, the motor, molding with metal brush fastening frame, comprises a plastic motor brush cap 1 (40), an armature rotor 2 (20), a motor shell 3 (10) and a stator(magnet) 4 (30, 31). The motor plastic brush cap 1 (40) is arranged with an electric circuit layer 5 (42), the fastening frame 6 (43), a resilient element 7 (432) and the brush 8 (44), wherein the fastening frame 6 (43) is made of metal and is integrally injection molded with the plastic brush cap 1 (40) as inserts. The magnet 4 (30, 31) is fastened to the inside the motor shell 3 (10) in an inserted piece manner. The magnet 4 (30, 31) is fastened to the inside the motor shell 3 (10) with high strength resilient inserting pieces to avoid the plastic brush cap 1 (40) connecting to the magnet holder which causes gaps, magnetic leakage and vibration noise with the motor shell 3 (10) and to improve efficiency of the motor to reduce risks of softening and deformation of the plastic while running in high temperature. And the structure of the stator with inserting pieces avoids the possibility of movement to right or left of the magnet.

Preferably, the inside end of the shaft of the armature rotor 2 (20) is assembled on a central groove of the inner wall of the plastic brush cap with a wheel 9 (213) and a wheel chamber 10 (411), while the other end of the rotating shaft of the armature rotor 2 (20) is assembled in a central hole of the motor shell 3 (10) to be extended to the outside. With the wheel 9 (213) and the wheel chamber 10 (411), comparing with the oil bearing of traditional motor, the service life of the motor is highly improved. With the wheel chamber 10 (411), the resonance of the armature rotor 2 (20) vibrating to the brush cap 1 (40) is reduced and the noise of the motor is reduced, too. The wheel chamber 10 (411) is capable of avoiding damage on the motor shell in the riveting during manufacturing and is helpful to the nonconcentricity of the shell of the motor in some way. The sealingness of the motor is increased and the manufacturing and assembling are more convenient to improve the efficiency of production. Furthermore, the brush cap 1 (40) comprises several reinforcing ribs on the inner wall in the central groove to enhance the strength of the brush cap 1 (40) to avoid damaging the brush cap 1 (40).

Preferably, the motor shell 3 (10) comprises a plurality of lugs 11 extended along the peripheral direction of assembly surface evenly to outside. The lugs have rivet holes and rivets 12. The plastic brush cap 1 (40) has mounting holes corresponded to the rivet holes on the motor shell 3 (10). The rivet holes of the shell 3 (10) and the mounting holes of the plastic brush cap 1 (40) are inserted with rivets during manufacturing to position accurately and reliably to avoid the looseness of the front and rear shells which is harmful to the sealingness of the motor.

Preferably, the resilient element 7 (432) is vortex spring. The vortex spring is replaced the one-arm-jumping spring to avoid risks of easily slipping out of the motor, and non-elastic of the spring during annealing in the running motor in high speed, and limiting the length of the brush in rear of the motor, and melting the plastic to be stuck with the spring while running with high temperature.

Preferably, the thickness of the motor shell 3 (10) is 2 mm. The thickness is increased from 1 mm to 2 mm to reduce the leakage magnetic flux which is beneficial to the performance of the motor.

In another embodiment of the invention, the fastening frame 6 (43) is disposed with two brush holder pressured bodies on the two side of the fastening frame 6 (43). The fastening frame 6 (43) as an inserted piece is ultrasonic welded on the brush cap 1 (40) via the brush holder pressured body.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A brushed DC motor, comprising:

a motor shell defining a receiving cavity therein and an installing opening at one end and an output opening at another end;

a stator fixed within said receiving cavity of said motor shell;

an armature rotor rotatably disposed inside said receiving cavity of said motor shell and surrounding by said stator while forming a gap therebetween with magnetic field, wherein said armature rotor has an inner end extended in said receiving cavity of said motor shell and an output end extended out of said motor shell through said output opening of said motor shell, wherein said armature rotor comprises an output shaft, a winding unit wound with an electrical coil and set around said output shaft for conducting electrical current to generate a magnetic field around said armature rotor and a commutator electrically connected with said winding unit correspondingly, adapted for driving said winding unit and said output shaft to rotate against said stator, wherein said inner end of said armature rotor is an inner end of said output shaft which is extended in said receiving cavity of said motor shell, wherein said output end of said armature rotor is an output end of said output shaft and is extended out of said motor shell through said output opening of said motor shell; and a brush cap connected with said motor shell by covering said installing opening of said motor shell and fastened said inner end of said armature rotor, wherein said brush cap comprises a base layer, an electric circuit layer formed on said base layer, at least one pair of brush frames affixed thereon symmetrically, and at least one pair of brushes respectively installed in said brush frames and electrically connected with said electric circuit layer, wherein said brush frames are made of metal for preventing overheating of said brushes, such that said brushes are held by said brush frames respectively and are electrically connected to said electric circuit layer to receive a current therefrom and conduct to said armature rotor for driving said output end of said armature rotor to rotate with respect to said stator, wherein said inner end of said armature rotor is fastened by said brush cap, wherein said brushes are positioned corresponding to said commutator, such that when said brushes receive the current from said electric circuit layer, said brushes conduct to said commutator to drive said winding unit and said output shaft to rotate against said stator, wherein said brushes are affixed on said base layer in a sunken manner to electrically connect to said electric circuit layer and a sealing ring is mounted around said output opening to water-seal said receiving cavity of said motor shell from outside.

2. A brushed DC motor, comprising:

a motor shell defining a receiving cavity therein and an installing opening at one end and an output opening at another end;

a stator fixed within said receiving cavity of said motor shell;

an armature rotor rotatably disposed inside said receiving cavity of said motor shell and surrounding by said stator while forming a gap therebetween with magnetic field, wherein said armature rotor has an inner end extended in said receiving cavity of said motor shell and an output end extended out of said motor shell through said output opening of said motor shell; and a brush cap connected with said motor shell by covering said installing opening of said motor shell and fastened said inner end of said armature rotor, wherein said brush cap comprises a base layer, an electric circuit layer formed on said base layer, at least one pair of brush frames affixed thereon symmetrically, and at least one pair of brushes respectively installed in said brush frames and electrically connected with said electric circuit layer, wherein said brush frames are made of metal for preventing overheating of said brushes, such that said brushes are held by said brush frames respectively and are electrically connected to said electric circuit layer to receive current therefrom and conduct to said armature rotor for driving said output end of said armature rotor to rotate with respect to said stator, wherein each of said brush frames comprises a frame body and a resilient element, wherein each of said frame bodies has a brush chamber defined therein to receive said brush body of one of said brushes therein, an inner open end facing a center portion of said base layer, an outer close end radially extended outwardly, and a guiding slot extended along one side of said frame body for said brush wire of said one of said brushes extending from said brush body therethrough to electrically connect with said electric circuit layer, wherein said resilient element of each of said brush frames is received in said frame body and disposed between said outer close end of said frame body and an outer end of said brush body received in said frame body so as to apply an inward pressing force to said brush body.

3. The brushed DC motor, as recited in claim 2, wherein two pairs of brush frames are provided symmetrically and perpendicularly and two pairs of brushes are installed in said two pairs of brush frames respectively.

4. The brushed DC motor, as recited in claim 2, wherein said stator comprises at least one pair of magnets, each having an arc shape, and an affixing device provided around an inner surrounding wall of said motor shell to fittingly mount said one pair of magnets symmetrically and intervally around said inner surrounding wall of said motor shell in position, wherein said affixing device holds said one pair of magnets in a symmetrical end to end manner around said inner surrounding wall of said motor shell.

5. The brushed DC motor, as recited in claim 3, wherein said stator comprises at least two pairs of magnets, each having an arc shape, and an affixing device provided around an inner surrounding wall of said motor shell to fittingly mount said two pairs of magnets symmetrically and intervally around said inner surrounding wall of said motor shell in position, wherein said affixing device holds said two pairs of magnets in a symmetrical end to end manner around said inner surrounding wall of said motor shell.

6. The brushed DC motor, as recited in claim 4, wherein said affixing device comprises at least two dividers for mounting each of said magnets between two of said dividers, wherein each of said dividers comprises a supporting member and two holders integrally connected to two ends of said supporting member respectively, wherein each of said holders is structured and shaped for holding on an end portion of one of said magnets, such that said magnets are symmetrically and intervally mounted around said inner surrounding wall of said motor shell by means of said dividers of said affixing device.

7. The brushed DC motor, as recited in claim 5, wherein said affixing device comprises at least four dividers for mounting each of said magnets between two of said dividers, wherein each of said dividers comprises a supporting member and two holders integrally connected to two ends of said supporting member respectively, wherein each of said holders is structured and shaped for holding on an end portion of one of said magnets, such that said magnets are symmetrically and intervally mounted around said inner surrounding wall of said motor shell by means of said dividers of said affixing device.

8. A brushed DC motor, comprising:
   a motor shell defining a receiving cavity therein and an installing opening at one end and an output opening at another end;
   a stator fixed within said receiving cavity of said motor shell;
   an armature rotor rotatably disposed inside said receiving cavity of said motor shell and surrounding by said stator while forming a gap therebetween with magnetic field, wherein said armature rotor has an inner end extended in said receiving cavity of said motor shell and an output end extended out of said motor shell through said output opening of said motor shell, wherein said armature rotor comprises an output shaft, a winding unit wound with an electrical coil and set around said output shaft for conducting electrical current to generate a magnetic field around said armature rotor and a commutator electrically connected with said winding unit correspondingly, adapted for driving said winding unit and said output shaft to rotate against said stator, wherein said inner end of said armature rotor is an inner end of said output shaft which is extended in said receiving cavity of said motor shell, and said output end of said armature rotor is an output end of said output shaft which is extended out of said motor shell through said output opening of said motor shell; and
   a brush cap connected with said motor shell by covering said installing opening of said motor shell and fastened said inner end of said armature rotor, wherein said brush cap comprises a base layer, an electric circuit layer formed on said base layer, at least one pair of brush frames affixed thereon symmetrically, and at least one pair of brushes respectively installed in said brush frames and electrically connected with said electric circuit layer, wherein said brush frames are made of metal for preventing overheating of said brushes, such that said brushes are held by said brush frames respectively and are electrically connected to said electric circuit layer to receive current therefrom and conduct to said armature rotor for driving said output end of said armature rotor to rotate with respect to said stator, wherein said inner end of said armature rotor is fastened by said brush cap, wherein said brushes are positioned corresponding to said commutator, such that when said brushes receive the current from said electric circuit layer, said brushes conduct to said commutator to drive said winding unit and said output shaft to rotate against said stator, wherein each of said brush frames comprises a frame body and a resilient element, wherein each of said frame bodies has a brush chamber defined therein to receive said brush body of one of said brushes therein, an inner open end facing a center portion of said base layer, an outer close end radially extended outwardly, and an guiding slot extended along one side of said frame body for said brush wire of said one of said brushes extending from said brush body therethrough to electrically connect with said electric circuit layer, wherein said resilient element of each of said brush frames is received in said frame body and disposed between said outer close end of said frame body and an outer end of said brush body received in said frame body so as to apply an inward pressing force to said brush body to push against said commutator of said armature rotor installed in said motor shell.

9. The brushed DC motor, as recited in claim 8, wherein two pairs of brush frames are provided symmetrically and perpendicularly and two pairs of brushes are installed in said two pairs of brush frames respectively.

10. The brushed DC motor, as recited in claim 8, wherein said stator comprises at least one pair of magnets, each having an arc shape, and an affixing device provided around an inner surrounding wall of said motor shell to fittingly mount said one pair of magnets symmetrically and intervally around said inner surrounding wall of said motor shell in position, wherein said affixing device holds said one pair of magnets in a symmetrical end to end manner around said inner surrounding wall of said motor shell.

11. The brushed DC motor, as recited in claim 9, wherein said stator comprises at least two pairs of magnets, each having an arc shape, and an affixing device provided around an inner surrounding wall of said motor shell to fittingly mount said two pairs of magnets symmetrically and intervally around said inner surrounding wall of said motor shell in position, wherein said affixing device holds said two pairs of magnets in a symmetrical end to end manner around said inner surrounding wall of said motor shell.

12. The brushed DC motor, as recited in claim 10, wherein said affixing device comprises at least two dividers for mounting each of said magnets between two of said dividers, wherein each of said dividers comprises a supporting member and two holders integrally connected to two ends of said supporting member respectively, wherein each of said holders is structured and shaped for holding on an end portion of one of said magnets, such that said magnets are symmetrically and intervally mounted around said inner surrounding wall of said motor shell by means of said dividers of said affixing device.

13. The brushed DC motor, as recited in claim 11, wherein said affixing device comprises at least four dividers for mounting each of said magnets between two of said dividers, wherein each of said dividers comprises a supporting member and two holders integrally connected to two ends of said supporting member respectively, wherein each of said holders is structured and shaped for holding on an end portion of one of said magnets, such that said magnets are symmetrically and intervally mounted around said inner surrounding wall of said motor shell by means of said dividers of said affixing device.

* * * * *